(12) United States Patent
Soini et al.

(10) Patent No.: US 7,406,489 B2
(45) Date of Patent: Jul. 29, 2008

(54) APPARATUS, SYSTEM AND METHOD FOR PERSISTENTLY STORING DATA IN A DATA SYNCHRONIZATION PROCESS

(75) Inventors: Petri Soini, Vantaa (FI); Timo Hotti, Lohja (FI)

(73) Assignee: Solid Information Technology OY, Helsinki (FI)

( * ) Notice: Subject to any disclaimer, the term of this patent is extended or adjusted under 35 U.S.C. 154(b) by 328 days.

(21) Appl. No.: 11/044,056

(22) Filed: Jan. 28, 2005

(65) Prior Publication Data

US 2006/0173930 A1 Aug. 3, 2006

(51) Int. Cl.
*G06F 17/30* (2006.01)
*G06F 7/00* (2006.01)

(52) U.S. Cl. ........................................ 707/204; 707/10
(58) Field of Classification Search ................. 707/204, 707/10
See application file for complete search history.

(56) References Cited

U.S. PATENT DOCUMENTS 6,101,504 A * 8/2000 Gord ........................... 707/201
6,446,092 B1 * 9/2002 Sutter ........................... 707/203
2003/0208550 A1 * 11/2003 Hamilton et al. ............ 709/212
2003/0212660 A1 * 11/2003 Kerwin ........................... 707/1

OTHER PUBLICATIONS

Oracle8i Data Guard, Concepts, Administration, and Installation Guide, Release 3.0, Oct. 2001 ORACLE®.*

* cited by examiner

*Primary Examiner*—Kuen S. Lu
(74) *Attorney, Agent, or Firm*—Young & Thompson

(57) ABSTRACT

An apparatus for synchronizing data between DBMSs has a first DBMS and a second DBMS. The second DBMS has a storage for persistently storing data items in a form of a storage structure, i.e. database. The second DBMS has also a second data storage for persistently storing data in a form of a sequential order, i.e. a transaction log. The data to be synchronized from the first DBMS to the second DBMS is analysed and based on the analyzing, it is decided how to persistently store the data between the first and the second data storage in the second DBMS. There can be decided how to store the data between the first and the second data storage. The characteristics of the data to be stored may influence on the storage between the first and the second data storage. Thus, the storage depends on the actual data to be stored.

32 Claims, 11 Drawing Sheets

APPARATUS, SYSTEM AND METHOD FOR PERSISTENTLY STORING DATA IN A DATA SYNCHRONIZATION PROCESS

TECHNICAL FIELD OF THE INVENTION

The invention concerns an apparatus for persistently storing data in a syncronization of the data according to the preamble of claim 1. Furthermore the invention concerns a system for persistently storing data and synchronizing data between database management systems. Yet furthermore the invention concerns the use of such apparatuses. Yet furthermore the invention concerns a computer program for carrying out the method of the invention.

BACKGROUND ART

Apparatus for persistently storing data such as a database management system (DBMS) can be a facility for storing large volumes of data and allowing multiple users to access and manipulate the data in an efficient and controlled fashion. Databases are traditionally considered as a large collection of (mainly disk-resident) shared data, managed and accessed by the DBMS.

Thus a database management system (DBMS) can, for example, be an entity, which comprises one or more databases and/or data management systems, whereby the system is responsible for reading the data structures contained in the database and/or data management systems and for changing these data structures.

A database can be a searchable and updateable information storage structure, which comprises one or more data objects, and the use of which is controlled by the DBMS. The structure may for example comprise index trees and data pages that may be accessed through the index trees.

A data object or data item may, on one hand, be an information structure, which can comprise other data objects or such data objects, which can be construed as atomary data objects. For instance, in a relational database data objects represent tables comprising rows. The rows comprise columns, which are typically atomary data objects. A tuple can mean the data item that may contain other objects as elements, e.g. a tuple may be one row containing single customer's data in a "customer" table of a database.

A database operation can be an event, during which data objects of the database are read from the database, during which data objects are modified, during which data objects are removed from the database, and/or during which data objects are added to the database. A set of database operations acting on the data objects is called a transaction. The transaction may comprise one or multiple operations. The transaction can also comprise other transactions.

A page in database environment can, for example mean a collection of data objects. A page may contain zero, one or multiple data objects. At maximum, the page may contain all data objects of the storage.

A database table can be a collection of zero or more data objects referred to as table rows, each having one or multiple data items referred to as column values. A checkpoint is a process where altered pages are written from one storage unit, such as RAM to another storage unit such as Disk. Typically, the end-result of a checkpoint is a snapshot of a database on the disk.

A transaction log can be a sequential storage of transaction data committed in the database. The transaction log is typically used for recovering committed data after re-starting a database management system after abnormal shutdown.

Two or more datababase management systems can be arranged to exchange data with each other. One such mechanism is data synchronization, where data is transferred from one database management system to at least one other database management system to make the data of the databases at least partially similar upon completion of the data transfer.

Database management systems should be optimized for two different aspects of performance. On one hand, the DBMS should be able to provide a relatively fast access to the data of the database. On the other hand, the server should be able to provide relatively high performance for writing data to a persistent storage. In addition to performance optimisation, the DBMS should possibly be able to recover data from different kinds of error situations, such as abnormal shutdown of the DBMS.

Such a known distributed database management system is shown in FIG. 1, to provide one known solution for this optimization challenge of the DBMS 20, where upon data synchronization, data from a first DBMS 10 is transferred to a second DBMS through a network connection and the second DBMS writtes the data into two different storage files in the second DBMS: database file(s) 22 and transaction log file(s) 23. To provide relatively quick access to data, the data is typically organized in the database files 22 in a tree-structure or some other, preferably searchable data structure. The most recently accessed and/or modified parts (database pages) of the database are kept in the cache memory 21 of the DBMS 20. When data item is inserted into the database, its location in the storage structure is determined e.g. by the key value of the data item. For this reason, data written to a database in a single transaction may reside in any number of different locations inside the database storage structure. On the other hand, a database log file, i.e. the transaction log file 23, contains the data of the committed transactions in a sequential order.

FIG. 1b shows another known distributed database management system. In this example, the data synchronization between the DBMSs is implemented in a separate application software process 16 that maintains a network connection to both the first and the second DBMS. To synchronize data between the DBMSs, the application reads data from one DBMS and writes it to the second DBMS.

FIG. 2 shows a transaction 100 containing data items 101-105 read from the first DBMS needed to synchronize some data between the first and second DBMS, a database storage structure 200 containing database pages 201-207 and transaction log file 300 containing pages 301-307.

FIG. 3 shows a known situation where during data synchronization the transaction 100 from the first DMBS is committed and thus made persistent on the storage device. The data elements 101-105 of the transaction should be written to the persistent storage media such as hard disk as efficiently and quickly as possible. In known cases, this means that the data must be written sequentially into the pages 301-307 of the transaction log file 300 as data values 101"-105". The data is also written into the cached pages 202-207 of database storage structure 200 as data values values 101'-105' but those pages may not be written to the database files 22 of a storage device until later. In this known system, high degree of efficiency is achieved because disk storage devices are much more efficient when writing data into sequential sectors on the disk instead of writing data into more random locations on the disk, e.g. to a tree-structure. The cached data of the database storage structure 200 is made persistent later at a checkpoint. A checkpoint can mean a routine in the DBMS software that writes all "dirty" pages, i.e. pages of the database storage structure that have been modified in-memory, to the persistent storage. Checkpoints are basically the occasions when data is written from the cache memory of the DBMS to the database files. However, some dirty database pages may be written to the disk also outside of a checkpoint when cache becomes too full of these dirty pages.

The FIG. 4 explains the data storing during data synchronization, e.g. a write transaction execution, method 400 known from the prior art. Some data read from the first DBMS 10 is received at the second DBMS and this begins a new write transaction in the step 401. The second DBMS receives from the first DBMS 10 or from a data synchronization application that reads data from the first DBMS a request to add a row to the database or delete a row from the database in the step 402. The server adds the data of the row to the transaction log in the step 403. If the operation was the last one of the transaction in the conditional step 404, the transaction is committed which means that the data of the new data of the transaction log is written to the transaction log file 23 in the step 405. At some point, the server may determine that a checkpoint is needed in the conditional step 406. The checkpoint process writes all the dirty pages of the cached part of the database storage structure to the database file(s) in the step 407. The server is now ready to continue executing transactions in the step 408, or terminate the transaction processing related to data synchronization in the step 409.

Transaction log files can be used for recovery from abnormal shutdowns. If a DBMS process is terminated abruptly, not all data of the database may be found in the database file(s). The DBMS guarantees that the database file(s) contain (s) all those transactions that were committed in the database when the most recent checkpoint was done. However, the DBMS also guarantees that the data of the transactions committed to the database since the checkpoint is stored persistently in the transaction log files. To recover from an abnormal shutdown of the database, the DBMS applies to the database all those committed transactions that are newer than the most recent checkpoint from the transaction log files. This is called a roll-forward recovery process and it brings the database back to the state where it was before the abnormal shutdown. FIG. 5 illustrates the roll-forward recovery process 500 as known in prior art. The process reads 501 a transaction's data from the transaction log, applies 502 the data into the database storage structure, checks 503 if there are additional transactions in the transaction log and completes 504 the recovery process when all transactions have been processed.

The down side of the known dual storage method and system for persistently storing data during data synchronization is that it may cause some overhead especially if the volume of the data of a transaction is large. In traditional DBMS synchronization systems, data volume of a single transaction has usually been in a range of few hundred bytes or at maximum few kilo-bytes. That small volume of data is written immediately to the transaction log file to guarantee persistence. The database files may be updated much later, along with data accumulated from other committed transactions. This way, server may optimize its performance by postponing the update of the database files to a point of time when the operation can be done more efficiently as there is more data that can be written to the database files at the same time.

Thus in the known data synchronization method and system, the data is written to the storage files of the second DBMS twice or more. This overhead has been justifiable by the performance gains achieved by the known method and system. However, the emergence of larger volume data as a data type, e.g. media data, managed by a DBMS and synchronized between DBMSs has made the overhead problem more significant in the data synchronization process. Transaction log is still needed for data recovery purposes but the performance penalty of using the logging when synchronizing transactions containing large volumes of data has grown high. Writing small volume of data twice to the disk storage does not cause a significant overhead especially because the second write may write data of multiple transactions to the disk at the same time. On the other hand, writing several megabytes or even gigabytes of data in one transaction causes a significant overhead, as the storage device must write a large amount of data twice to the disk concurrently. This happens because the large volume of data of the transaction does not fit in the cache memory of the DBMS and the data must thus be written immediately to the database files to prevent the cache from becoming full. This very often means that maximum synchronization performance of the DBMS that manages larger data volumes is severely degraded.

As it is important to guarantee persistence of the data of all committed transactions while synchronizing data between DBMSs, it is important to improve the data storage method and,system so that the performance overhead of using the DBMS for synchronizing transactions containing larger volumes of data stays at a tolerable level.

SUMMARY OF THE INVENTION

It is therefore the object of the invention to better adapt the method, system and apparatus for persistently storing synchronized data to the characteristics of the data being synchronized. The object is achieved by apparatus according to claim 1. In accordance with further aspect of the invention the object is also achieved by a system according to the apparatus. Yet furthermore the object of the invention is achieved by the use of such apparatuses. Yet furthermore the object of the invention is achieved by a computer program for carrying out the method of the invention.

In the invention, the apparatus for synchronizing data between two DBMSs comprises a first data storage for persistently storing data item in a searchable storage structure. The structure can, for example, be used in database file(s). The apparatus has also a second data storage for persistently storing data item in a form of a sequential order. The sequential order can, for example, be used in a data log. The data item may be stored in the second DBMS receiving the data item, which DBMS contains the apparatus and the data storages. The apparatus may also synchronize the data between the two DBMSs. The data to be stored is analysed and based on the analysis, it is decided how to persistently store the data between the first and the second data storage. The persistent data storage method between first and the second data storage can be decided based on the result of the analysis. The analysis may take into account the data type of the data item, the data volume of the data item and/or the expected physical location of the data item in the searchable data storage structure, for example. The analysis may take place in the first DBMS, in the second DBMS or in a separate application program that performs the data synchronization between the two DBMSs. Advantageously, there can be decided how to store the data between the first and the second data storage. For example, the characteristics of the data to be stored may have influence on the storage between the first and the second data storage. Thus, the storage depends on the actual data to be stored. For example, the data to be stored can be assessed based on a set of pre-defined rules. Advantageously, effective exchange and persistent storage of data is achieved between at least two DBMS.

Further embodiment of the invention relates generally to a database management system (DBMS) as well as data synchronization process and storage level software processes related to DBMS, and more particularly selecting an appropriate persistent data storage method such as transaction persistence method based on the characteristics of the data that is to be written to the database of the second DBMS during data synchronization.

In another further embodiment of the invention, the reasonable performance for data synchronization process can be achieved when the data of a transaction is first written to the second data storage, e.g. a transaction log, and written to the first data storage, e.g., database file(s), later. However, in some cases it is more efficient to make some data of the transaction persistent directly in the database file(s). The optimal storage method depends on the actual data being synchronized. Advantageously, the speed of write operations can be maintained and increased in the database management system during data synchronization.

In yet another further embodiment in order to determine, which of these methods is more efficient for the data of a specific transaction of the synchronization process, the first or second DBMS or a third software process assesses the content of the transaction using a set of rules. As an example, there may be a rule that instructs the DBMS to write data first to a transaction log file (example of the second data storage) and later to the database file(s) (example of the first data storage), if the overall volume of data to be written to the database by a transaction is small. Another rule may instruct the same behaviour if a data element of the transaction, such as a value of a column of a row in a relational database, is going to be located in a large number of different, non-consecutive pages in the database storage structure. As yet another example, there may be a rule that instructs the second DBMS to write some data of a transaction directly to a database storage structure and omit the corresponding data from the transaction log file, if the data volume of the data element exceeds a pre-defined threshold value or if the data type of the data element is one that's known to be more efficiently stored directly in the storage structure. In place of the omitted data, the transaction log file may contain a reference to the omitted data or there may be some other means to identify the data that was written directly to the database pages. That information is needed when recovering the database from an abnormal DBMS shutdown using for example a roll-forward recovery process.

In yet another further embodiment for the roll-forward recovery process, as the roll-forward recovery process is started, the server starts up using the state of the most recent checkpoint as starting point. The transactions that have been committed to the database after the checkpoint are read from the transaction log file and applied to the database storage structure. If all data of the transaction was upon transaction commit written to the transaction log, then it is applied to the database storage structure as such. However, if some data of the transaction was written directly to the database files, the roll-forward recovery process reads that part of the transaction's data from the pages of the database files instead of transaction log files.

Yet further embodiments of the invention have been specified in the dependent claims.

BRIEF DESCRIPTION OF THE DRAWINGS

The invention will now be described, by way of examples only, with reference to the accompanying drawings, in which.

DESCRIPTION OF FURTHER EMBODIMENTS

Some further embodiments of the invention relate to a method and apparatus for optimising write operations in a database management system for better performance when at least two DBMSs exchange information with each other for example by means of data synchronization. Advantageously, some further embodiments are applicable in the roll-forward recovery on database's data after an abnormal shutdown.

Figure 1A:
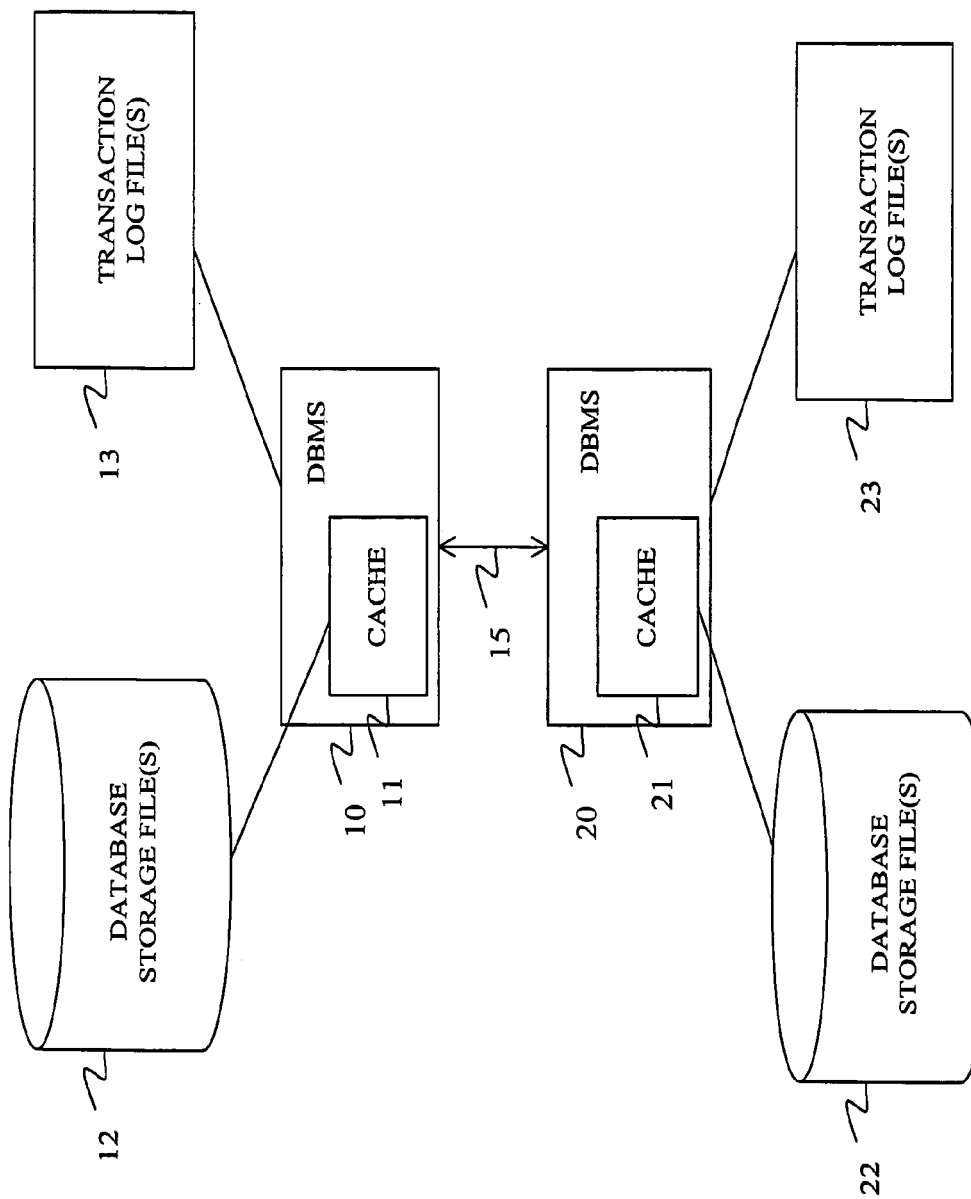
FIG. 1a depicts two common database management systems that have been arranged to exchange data with each other according to prior art.
Figure 1B:
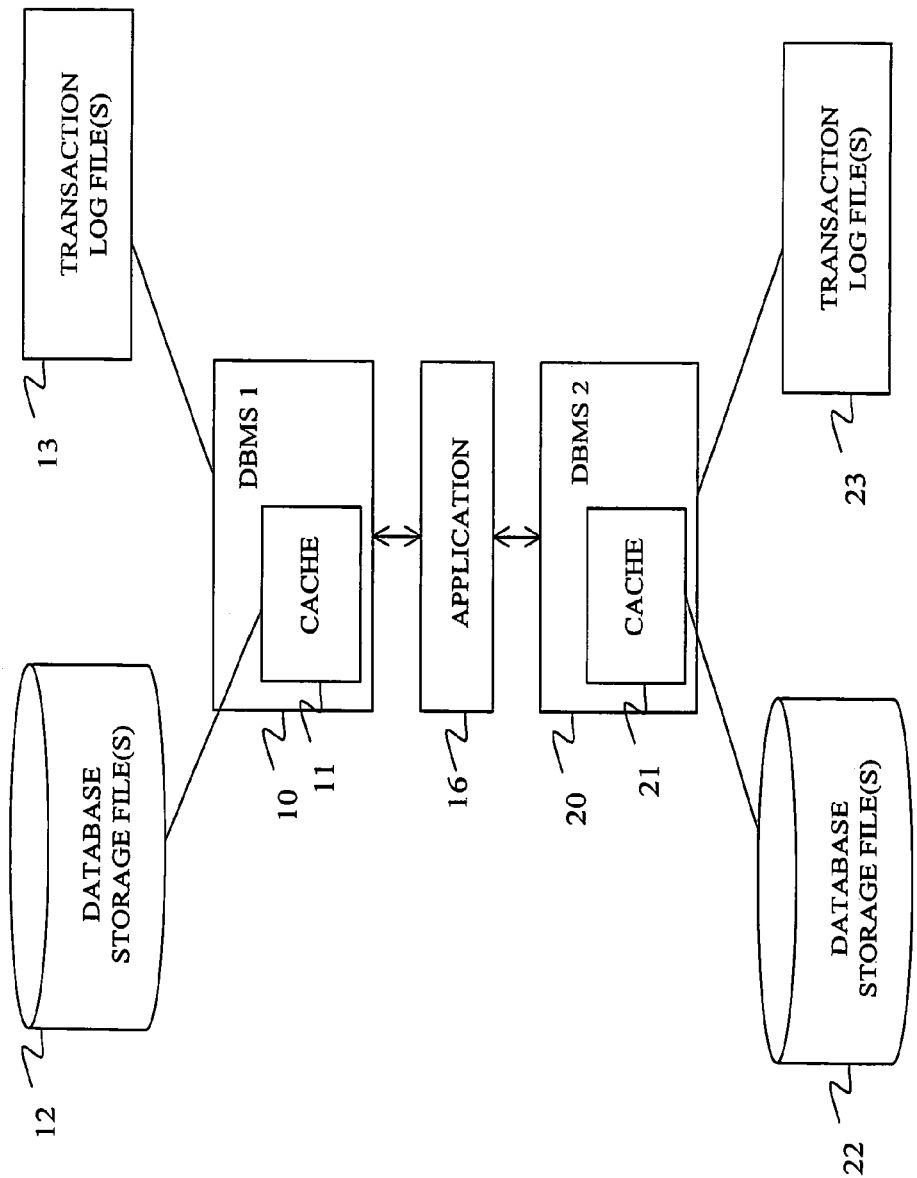
FIG. 1b depicts two common database management systems that have been arranged to exchange data with each other through a separate application software process according to prior art.
Figure 2:
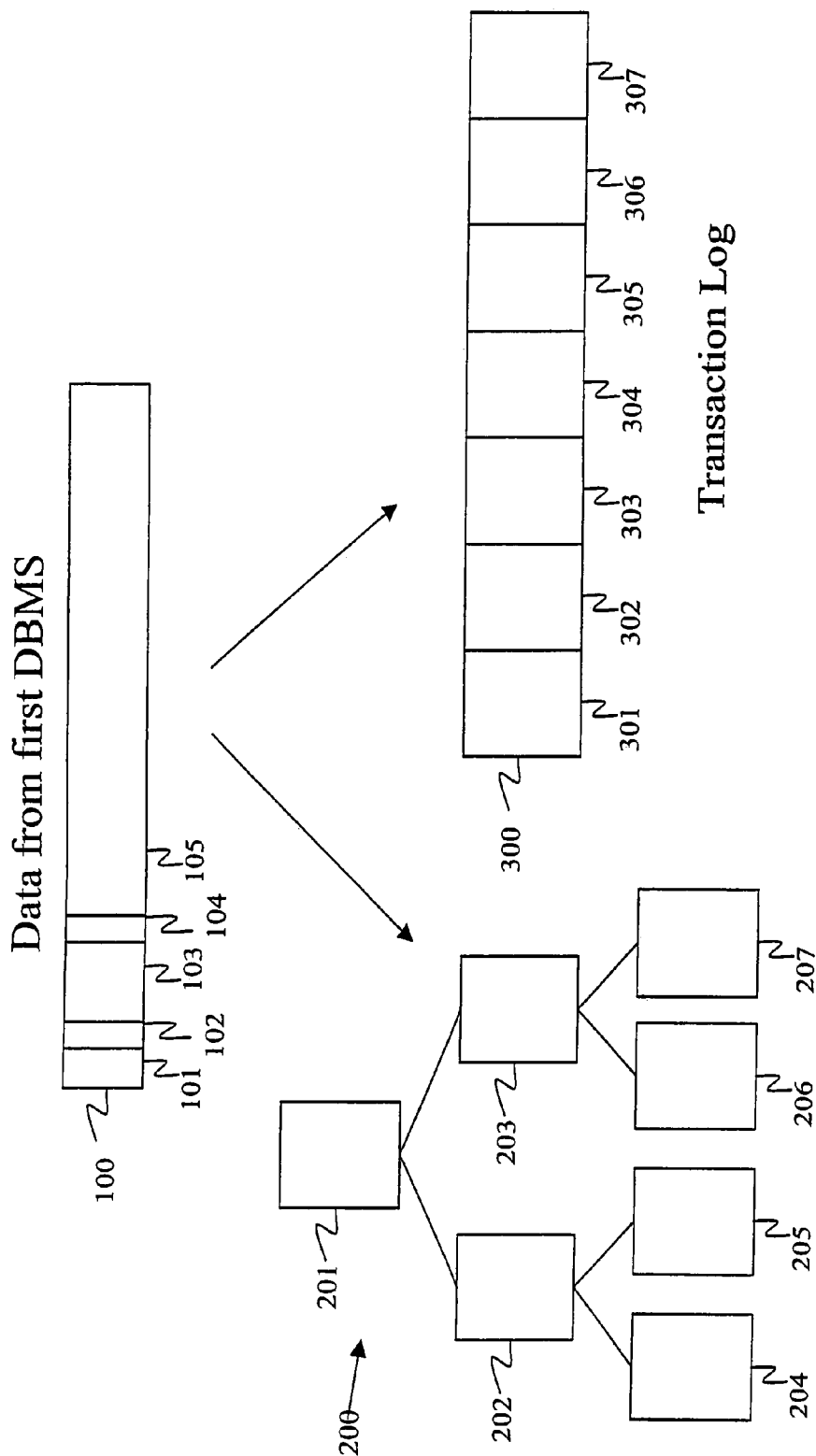
FIG. 2 depicts a transaction of a synchronization process, database storage structure and a transaction log according to prior art.
Figure 3:
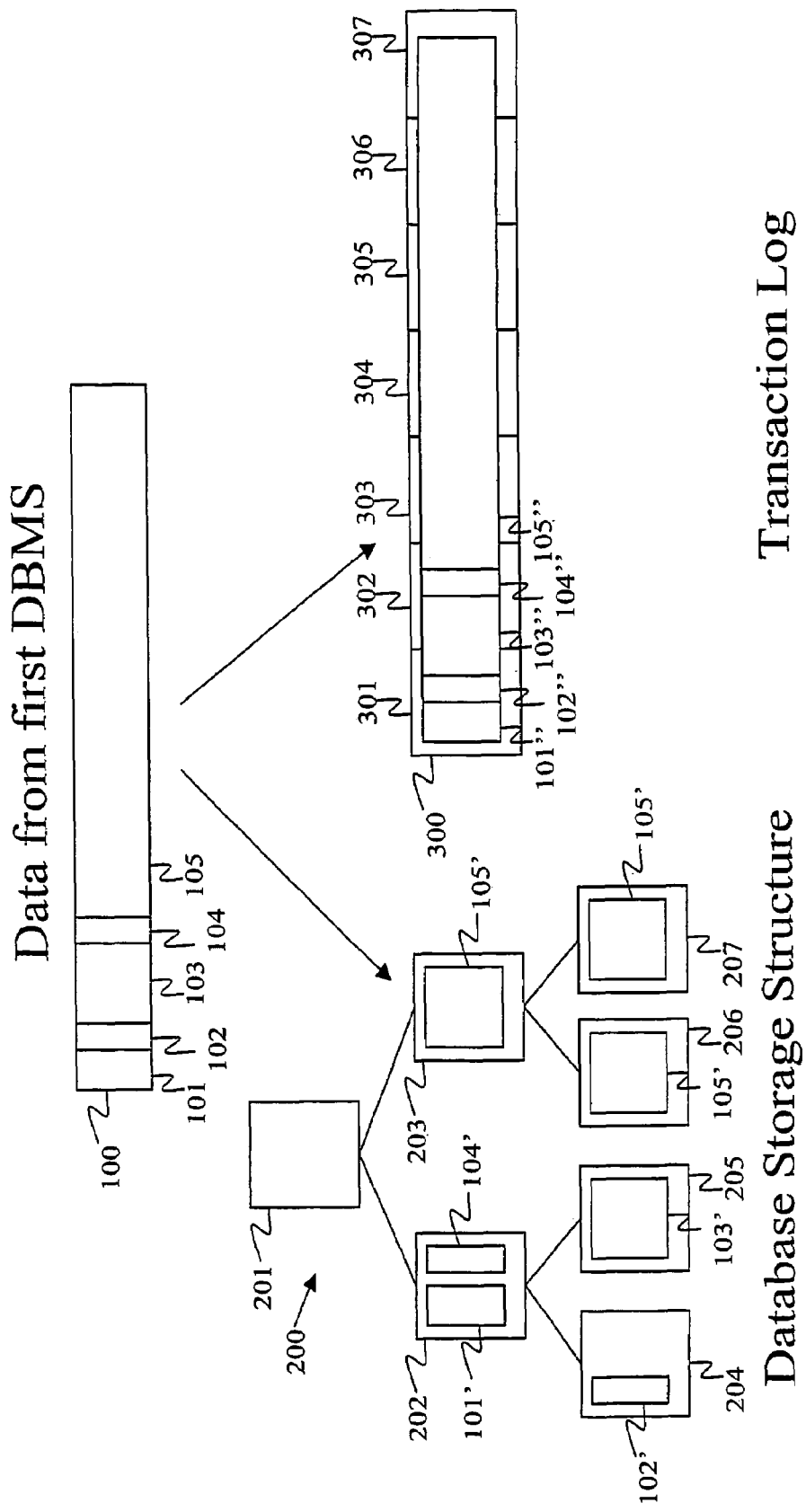
FIG. 3 depicts an arrangement of executing a transaction of a synchronization process according to prior art.
Figure 4:
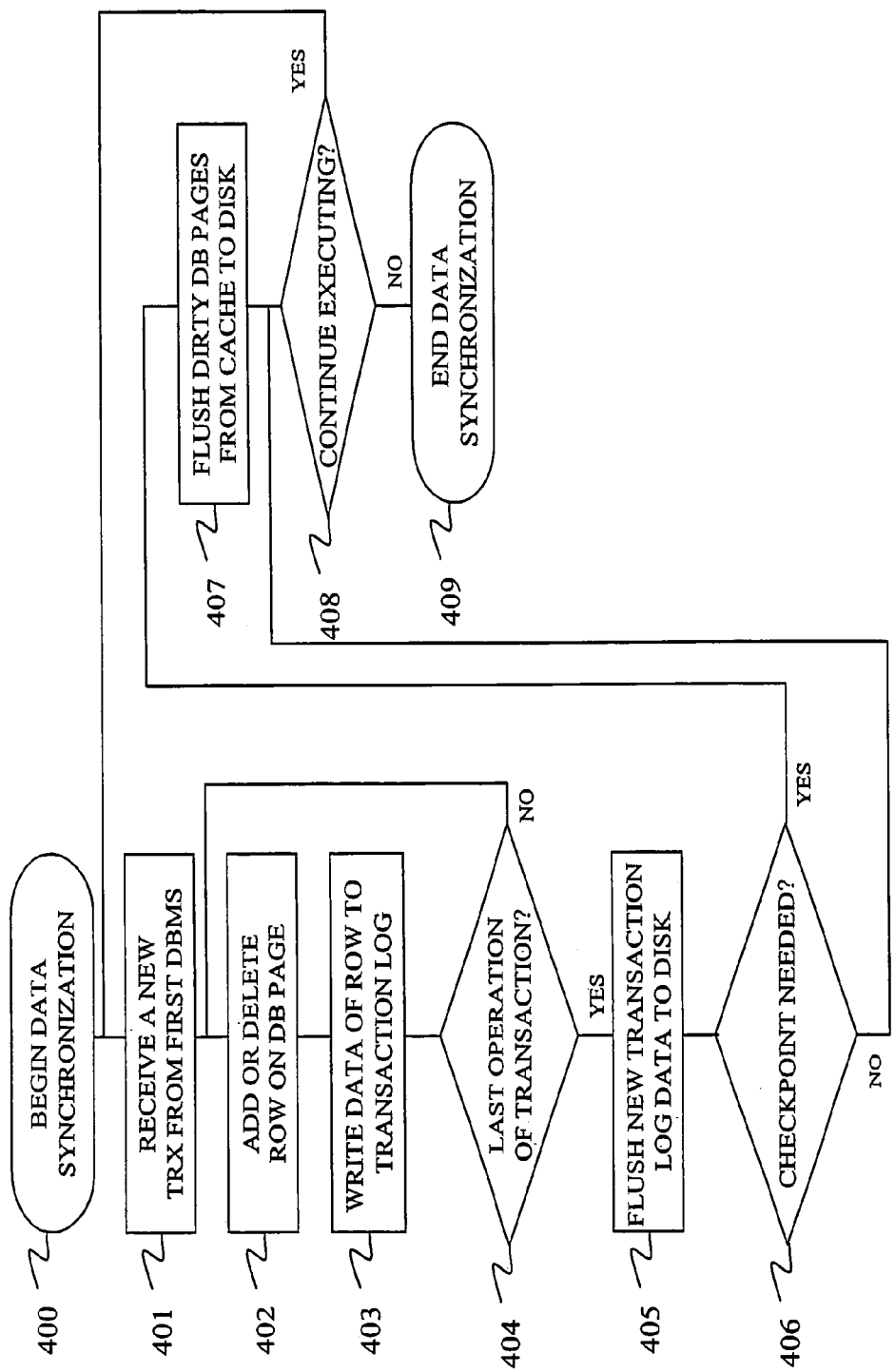
FIG. 4 depicts an example of a flow chart of a method for executing transactions of a synchronization process according to prior art.
Figure 5:
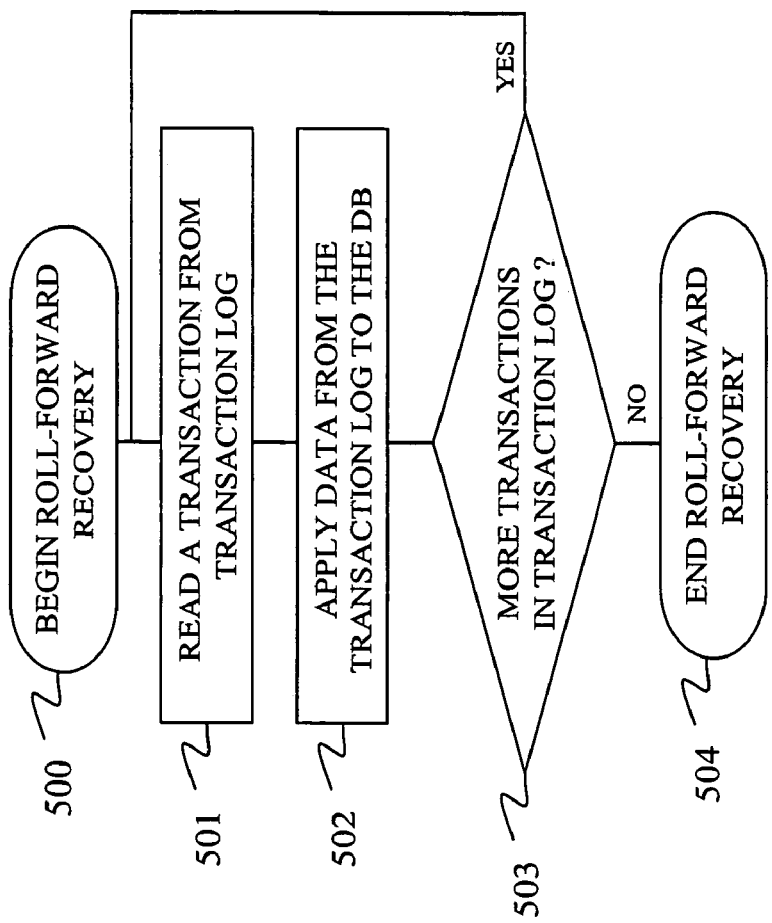
FIG. 5 depicts an example of a flow chart of a method for performing roll-forward recovery of a DBMS according to prior art.
Figure 6:
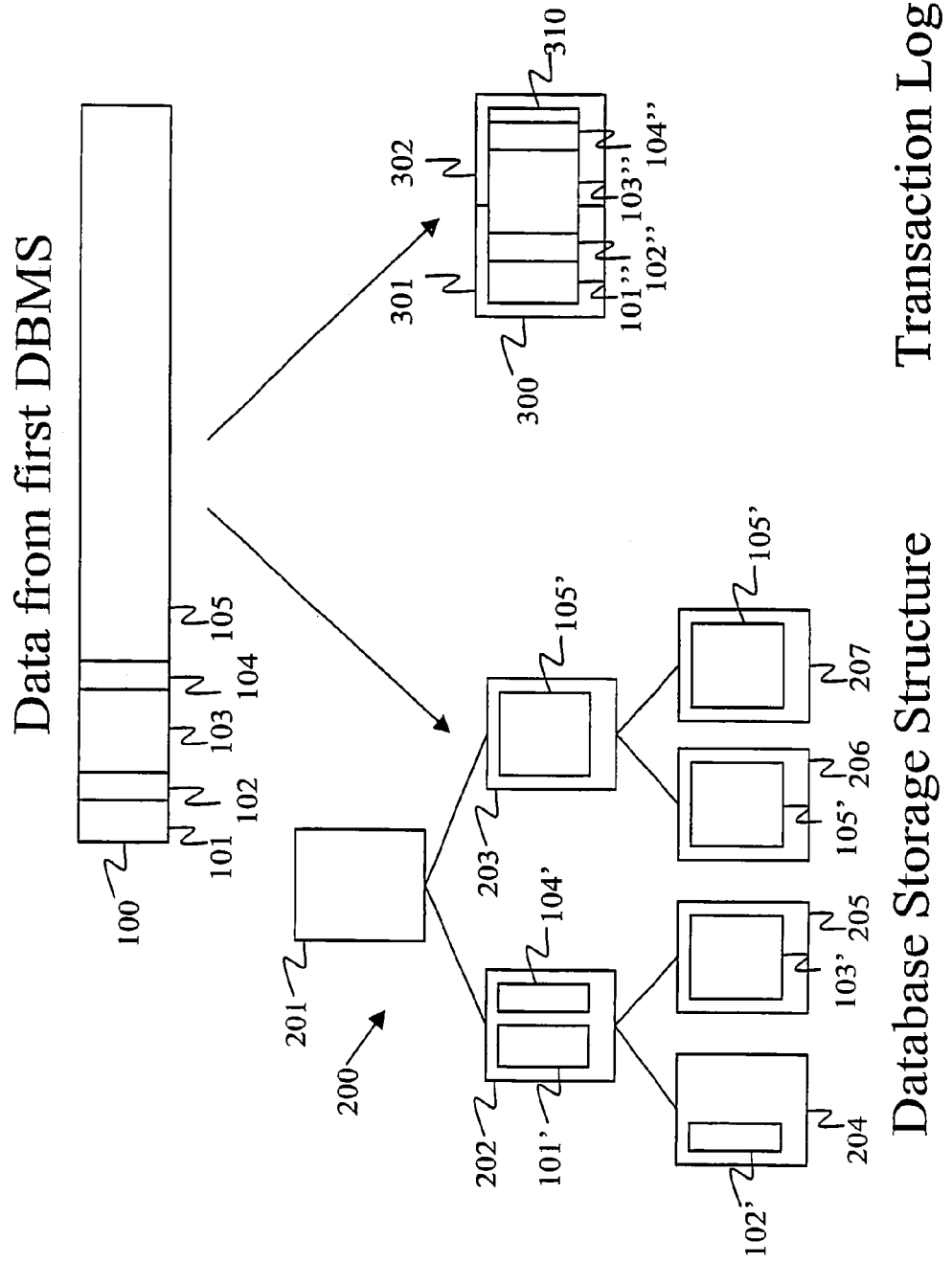
FIG. 6 depicts an arrangement for executing a transaction of a synchronization process according to a further embodiment of the invention.

The further embodiment of the invention relates to selecting a database write method in a relational DBMS arrangement for executing transactions related to data synchronization that is depicted in the FIG. 6. As part of the data synchronization process, the first DBMS sends a transaction 100 to the second DBMS either directly or via a separate software application that provides the data synchronization functionality. The transaction comprises one or multiple data write operations each of which may comprise one or multiple data items 101-105. When transaction is written to the database, the data items 101-105 are written to the cached pages 201-207 of the database storage structure 200. Prior to writing the transaction's data 101-105 to the transaction log 300, the data is analysed and based on the analysis, it is determined that data item 105 of the transaction 100 is of such nature that it is more efficient not to write it to the transaction log 300 in the current hardware and software configuration of the second DBMS. Instead, a reference 310 to the data item 105 is written to the transaction log along with the data 101"-104" of the data items 101-104. Typically, the analysis step is performed in the second DBMS. However, the analysis step may also be performed in the first DBMS before sending the data to the second DBMS or the analysis step may be performed by the optional separate application 16 while the application is transferring the data from the first DBMS to the second DBMS. When the second DBMS commits the transaction, the pages 301 and 302 of the transaction log are written to the storage device along with the pages of the database storage structure containing data 105' of the data item 105. Now the data of the entire transaction 100 has been made persistent.

Figure 7:
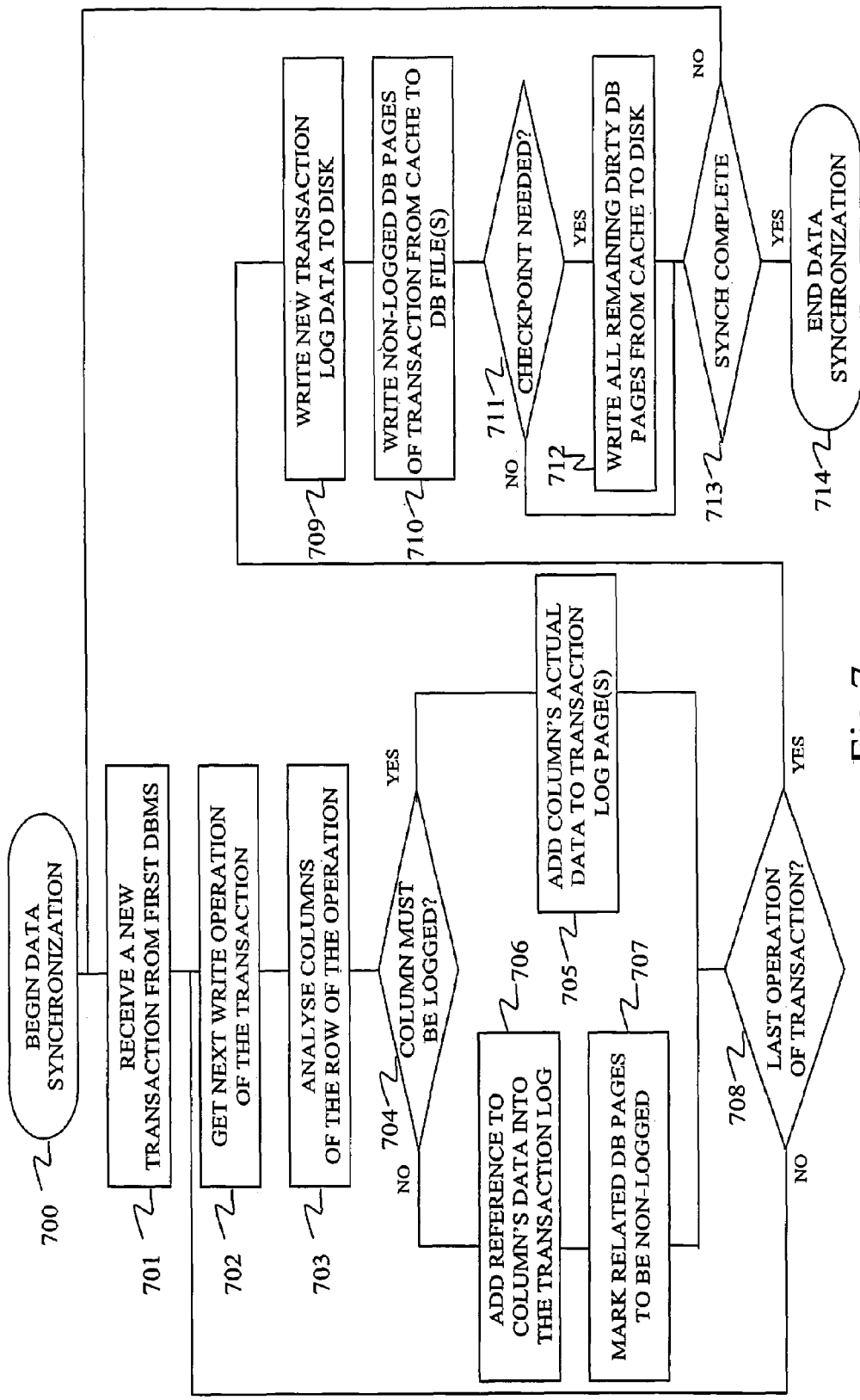
FIG. 7 depicts a flow chart for analysing and executing transactions of a synchronization process according to another further embodiment of the invention.

FIG. 7 depicts a flow chart for executing transactions of a synchronization process according to another further embodiment of the invention. When the second DBMS is ready to execute write transactions of a data synchronization process (step 700), the first DBMS may send new transaction to the second DBMS that begins a new transaction 701 (step 701) in the second DBMS. As a part of the new transaction, a new write operation 702 needs to be executed in the second DBMS in the (step 702). Upon executing the write operation, the second DBMS performs an analysis on the data of the row (step 703) and determines (step 704) whether all data of the transaction should be written to the transaction log (e.g. refs. 23, 300) or whether some of it should be omitted from the transaction log and written directly to the database files containing the database storage structure (e.g. refs. 22, 200). If the second DBMS decides that all data is of loggable nature, it creates (step 705) a transaction log entry of all the data of the operation. If the DBMS decides that some of the data is of non-loggable nature, it creates (step 706) a transaction log entry where some data of the operation is omitted and an optional reference to the omitted data is included in the transaction log entry. Additionally, the server marks (step 707) the database pages that contain the data omitted from the transaction log to be non-logged pages. If the operation was a last one (step 708) of the transaction, the data of the transaction log entries is persisted in the transaction log file (step 709) and those pages of the database storage structure that contain non-logged pages of the transaction are persisted (step 710) in corresponding database file(s) as well. The DBMS may optionally check (step 711) whether there is a need for performing a checkpoint. If such need is detected, the DBMS writes all dirty cached pages (step 712) of the database storage structure to the database storage file(s). If the transaction was the last one of the synchronization process 713, the data synchronization process is ended 714.

Figure 8:
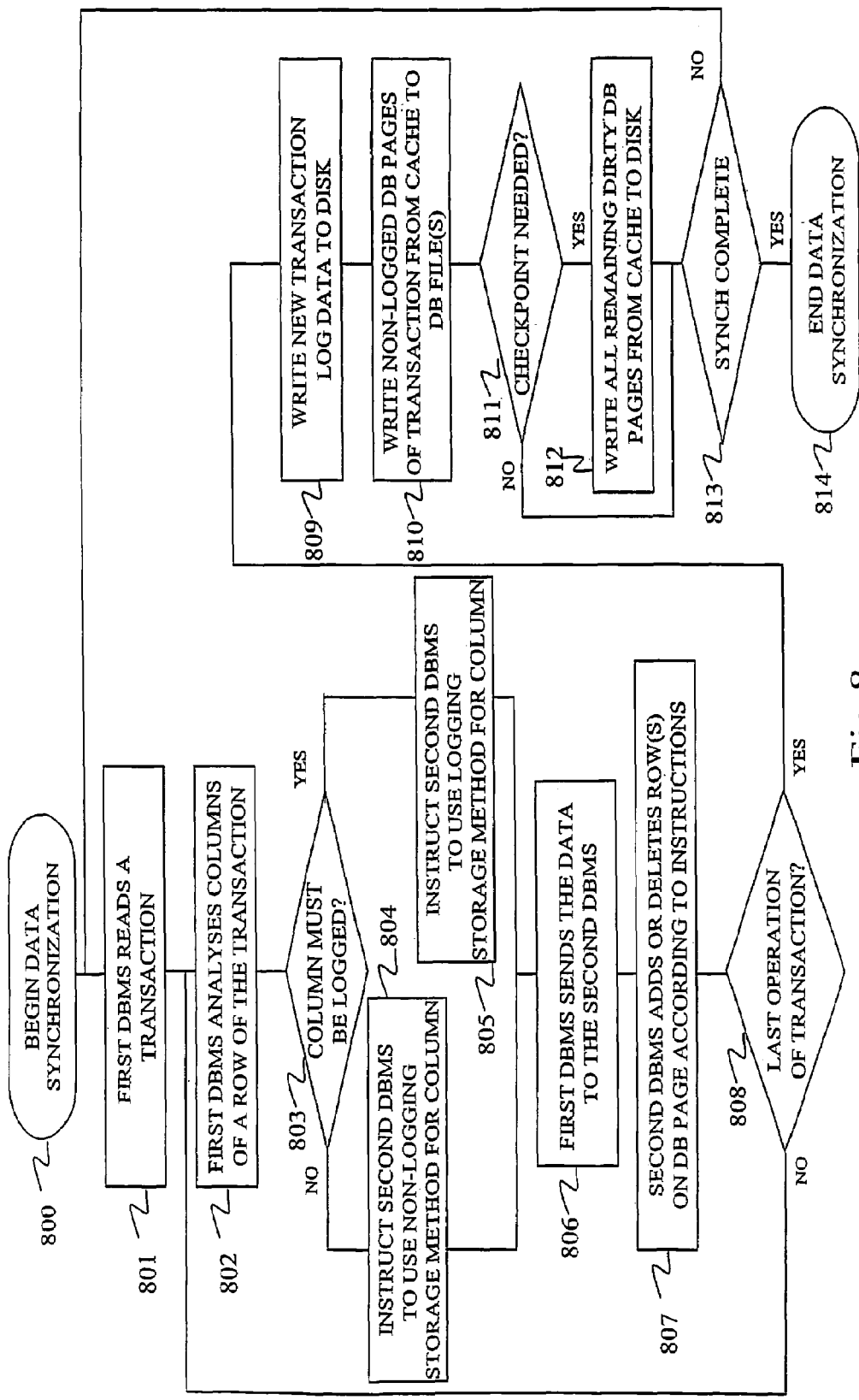
FIG. 8 depicts a flow chart for analysing and executing transactions of a synchronization process according to another further embodiment of the invention.

Another further example of a sequence of steps to execute transactions is shown in the FIG. 8. When data synchronization between the first and the second DBMS is started, the first DBMS reads a transaction from its database 801. Now the first DBMS analyses the data it has read from the database 802 and for each data item, decideds how the data item should be stored in the second DBMS 803. The first DBMS may instruct the second DBMS to store the data item using logging 805 or non-logging 804 storage method. After analysis, the data is sent from the first DBMS to the second DBMS 806 and the second DBMS writes the data to its storages according to the instructions 807. Once all operations of the transaction have been completed 808, the transaction is committed in the second DBMS 809, 810 and optionally, a checkpoint is performed 811,812 in the second DBMS. If the transaction was the last one of the synchronization process 813, the data synchronization process is ended 814.

Figure 9:
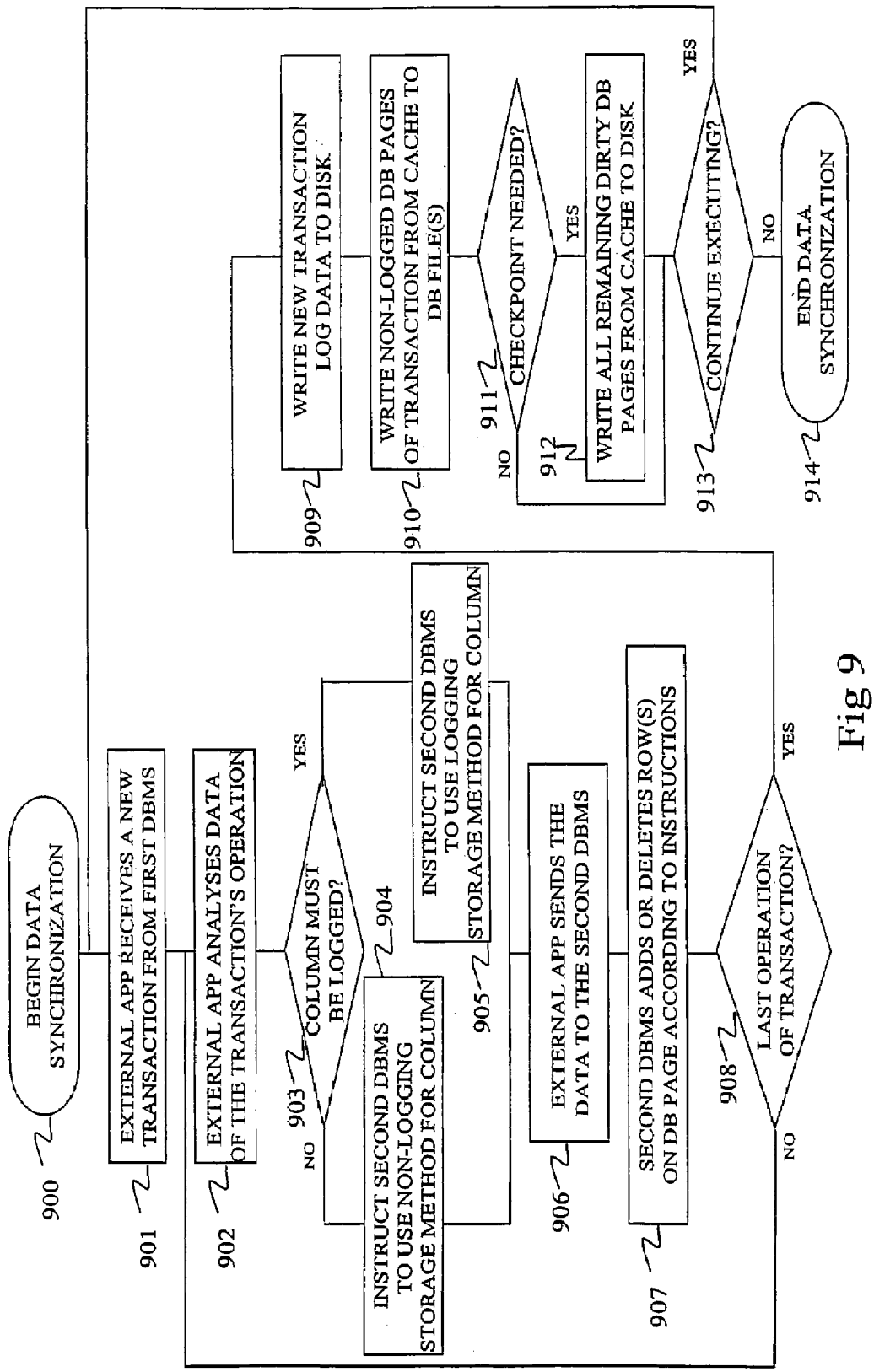
FIG. 9 depicts a flow chart for analysing and executing transactions of a synchronization process according to another further embodiment of the invention.

Yet another further example of a sequence of steps to execute transactions is shown in the FIG. 9. When data synchronization between the first and the second DBMS is started, the external application 16 reads a new transaction from the first DBMS 901. Now the external application analyses the data it has read from the database 902 and for each data item, the application decides how the data should be stored in the second DBMS 903. The second DBMS may instruct the second DBMS to store the data item using logging 905 or non-logging 904 storage method. After analysis, the data is sent from the external application to the second DBMS 906 and the second DBMS writes the data to its storages according to the instructions 907. Once all operations of the transaction have been completed 908, the transaction is committed in the second DBMS 909, 910 and optionally, a checkpoint is performed 911,912 in the second DBMS. If the transaction was the last one of the synchronization process 913, the data synchronization process is ended 914.

Figure 10:
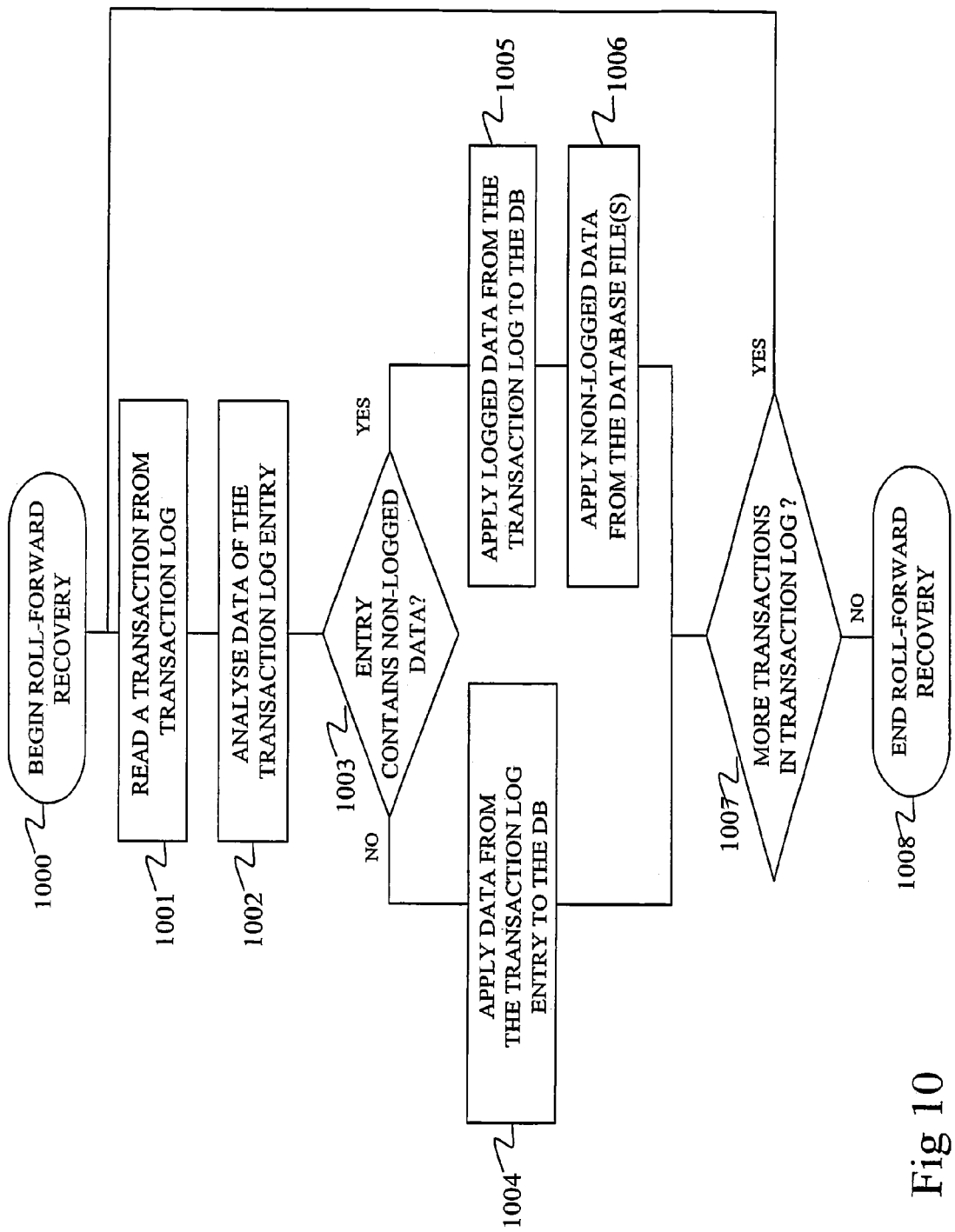
FIG. 10 depicts a flow chart for performing roll-forward recovery according to yet another further embodiment of the invention.

Yet another further embodiment of the invention is illustrated in FIG. 10 that shows the method for performing the roll-forward recovery on transactions, whose data may have partially been persisted in the database file(s) of the second DBMS. When a roll-forward recovery is needed (step 1000), the DBMS reads (step 1001) a transaction from the transaction log file and analyses (step 1002) the content of the read item. If the item contains all data of the operation (step 1003), it is applied to the database generally as such (step 1004). If the transaction log entry contains only part of the data of the operation, the DBMS applies the data (step 1005) from the transaction log and locates (step 1006) the missing part from the database storage structure and adds that data to the recovered transaction. If there are additional transactions (step 1007) in the transaction log the server continues roll-forward process with another transaction or terminates (step 1008) the roll-forward process.

The apparatus and the method of further embodiments can be applied on a computer system. The computer system can contain a database and the transaction log. Further, the apparatus of a preferred embodiment of the present invention may use an article of manufacture comprising a computer-readable storage medium having computer instructions stored in said medium which may cause the computer system to practice the embodiment. Furthermore the apparatus and the method of further embodiments are applicable in a computer network system. For example, the request for database operation can be received from the network at the DBMS coupled with the network. The method of further embodiments can be embodied by a computer code means, possibly in combination with programmable logic means, to control the data storage and processing means in the apparatus such as DBMS.

Ramifications and Scope

Although the description above contains many specifics, these are merely provided to illustrate the invention and should not be constructed as limitations of the invention's scope. It should be also noted that the many specifics can be combined in various ways in a single or multiple embodiments. Thus it will be apparent to those skilled in the art that various modifications and variations can be made in the apparatuses and processes of the invention without departing from the spirit or scope of the invention.

The invention claimed is:

1. An apparatus for exchanging data between a first database management system and a second database management system,
    wherein the second database management system is configured to have a data communication coupling with the first database management system and to receive at least one data item from the first database management system,
    the second database management system of the apparatus comprising
    a computer system,
    a first data storage for persistently storing said at least one data item in a form of a database storage structure and a second data storage for persistently storing said at least one data item in a form of a sequential order, wherein the apparatus is further configured to analyze said data item and based on the analyzing, decide how to persistently store said data item in said first and said second data storage of the second database management system and persistently store said data item in said first data storage and optionally store said data item or a reference to said data item in said second data storage of the second database management system according to the decision.

2. The apparatus according to claim 1, wherein said apparatus is contained in said second database management system for receiving and persistently storing said at least one data item in the second database management system.

3. The apparatus according to claim 1, wherein said apparatus is contained in a synchronization application for synchronizing data between the database management systems.

4. The apparatus according to claim 1, wherein the at least one data item is transferred from the at least one first database management system to the at least one second database management system through a separate application software process.

5. The apparatus according to claim 4, wherein the at least one data item is analysed and the persistent storage of the data item is determined in the separate application process.

6. The apparatus according to claim 1, wherein the at least one data item is analysed and the persistent storage of the data item is determined in the first database management system.

7. The apparatus according to claim 1, wherein the at least one data item is analysed and the persistent storage of the data item is determined in the said at least one second database management system.

8. The apparatus according to claim 1, wherein apparatus is configured to analyse and persistently store plurality of data items, each of the data items being separately analysed and decided how to persistently store it between the storages.

9. The apparatus according to claim 1, wherein said apparatus is further configured to make the decision how to persistently store said data item based on characteristics of said data item to be stored.

10. The apparatus according to claim 9, wherein said characteristics comprises the size of said data item to be stored.

11. The apparatus according to claim 9, wherein said characteristics comprises the data type of said data item to be stored.

12. The apparatus according to claim 1, wherein said decision comprises that at least a part of said data is to be directly stored to said first data storage.

13. The apparatus according to claim 1, wherein said decision comprises that said data is to be initially stored to said second data storage.

14. The apparatus according to claim 13, wherein volume of said data is small.

15. The apparatus according to claim 13, wherein the data stored in said second data storage is adapted to be written into the first data storage.

16. The apparatus according to claim 15, wherein the writing is adapted to be performed at a predetermined time.

17. The apparatus according to claim 1, wherein the decision comprises that a portion of said data is adapted to be stored directly into said first data storage and said portion is adapted to be omitted from the data adapted to be stored to said second data storage.

18. The apparatus according to claim 17, wherein said portion of data stored to the first data storage is written to disk together with said portion of data stored to the second data storage upon transaction commit.

19. The apparatus according to claim 17, wherein volume of said data exceed a pre-defined threshold value.

20. The apparatus according to claim 1, wherein said second data storage is adapted to store a identification of data stored to said first data storage.

21. The apparatus according to claim 20, wherein the data stored to said first data storage is not stored to said second data storage and said identification is adapted to indicate that data.

22. The apparatus according to claim 1, wherein said data is temporarily stored in a cache before storing it persistently in said first data storage.

23. The apparatus according to claim 1, wherein said first data storage comprises a database.

24. The apparatus according to claim 1, wherein said second data storage comprises a transaction log.

25. The apparatus according to claim 1, wherein said data comprises a transaction.

26. The apparatus according to claim 25, wherein said database management system is embodied on a computer.

27. The apparatus according to claim 25, wherein said database management system is embodied on a computer network.

28. The apparatus according to claim 1, wherein said apparatus is further configured to perform a roll-forward process for recovering data of said at least one second database management system after an abnormal shutdown situation.

29. The apparatus according to claim 28, wherein said roll-forward process is adapted to perform following steps: reading data of at least one recoverable transaction from the second data storage, including the data of the recoverable transaction read from the second data storage into the recovered data of the transaction, determining if at least some of the recoverable transaction's data has been written directly to the first data storage, reading additional data of the recoverable transaction from the first data storage and including it into the recovered data of the transaction and making the recovered data of the transaction persistent in the first data storage.

30. A method for exchanging data between a first database management system and a second database management system, wherein the second database management system is configured to have a data communication coupling with the first database management system and to receive at least one data item from the first database management system, the method comprising the steps of:

assessing said at least one data item, and based on the assessment deciding how to persistently store said at least one data item in the second database management system between a first data storage in a first persistent data storing form and a second data storage in a second persistent data storing form; and storing the data item according to the decision into said first data storage and optionally storing said data item or a reference to said data item into said second data storage of the second database management system, wherein the first persistent data storing form is a database storage structure, and the second persistent data storing form is a sequential order.

31. A computer-readable storage medium having a computer program stored upon, executable on a computer, for exchanging data between a first database management system and a second database management system, wherein the second database management system is configured to have a data communication coupling with the first database management system and to receive at least one data item from the first database management system, the computer program comprising:
means for assessing said at least one data item, and based on the assessment means for deciding how to persistently store said at least one data item in the second database management system between two persistent data storing form, and
means for storing the data according to the decision
wherein the first persistent data storing form is a database storage structure, and
the second persistent data storing form that receives the at least one data item or a reference thereto.

32. A system for exchanging data between database management systems, each embodied on a computer system, comprising:
a first database management system,
a second database management system configured to contain a data communication connection with the first database management system and to receive data items from the first database management system,
the second database management system further comprising:
a first data storage for persistently storing the data items in a form of a database structure, and
a second data storage for persistently storing data items in a form of a sequential order,
wherein the system is further configured to analyze each of the data items based on the analyzing, decode how to persistently store each of the data items between the first and the second data storage in the second database management system and to store the data according to the decision.

* * * * *